United States Patent [19]

Murray

[11] Patent Number: 4,759,266

[45] Date of Patent: Jul. 26, 1988

[54] MULTIPLE PART OIL-CONTROL RING FOR PISTON

[75] Inventor: Edward J. Murray, West Yorkshire, United Kingdom

[73] Assignee: AEPLC, Warwickshire, United Kingdom

[21] Appl. No.: 2,169

[22] PCT Filed: May 14, 1986

[86] PCT No.: PCT/GB86/00266

§ 371 Date: Jan. 12, 1987

§ 102(e) Date: Jan. 12, 1987

[87] PCT Pub. No.: WO86/06810

PCT Pub. Date: Nov. 20, 1986

[30] Foreign Application Priority Data

May 17, 1985 [GB] United Kingdom ............... 8512512

[51] Int. Cl.⁴ .............................................. F16J 1/06
[52] U.S. Cl. ...................................... 92/205; 92/172; 92/192; 92/257; 277/216
[58] Field of Search ............... 92/205, 257, 227, 229; 123/193 P; 277/139, 140, 141, 142, 216; 267/1.5

[56] References Cited

U.S. PATENT DOCUMENTS

| | | | |
|---|---|---|---|
| 2,817,765 | 12/1957 | Heiss | 277/139 |
| 2,904,377 | 9/1959 | Endres et al. | 267/1.5 |
| 3,627,333 | 12/1971 | Hill | 277/139 |
| 3,738,668 | 6/1973 | Minegishi | 277/141 |
| 3,768,818 | 10/1973 | Minegishi | 277/141 |

Primary Examiner—Robert E. Garrett
Assistant Examiner—Thomas Denion

[57] ABSTRACT

An oil control ring for a piston in an i.c. engine comprising an expander ring and two lamellar rails which scrape the oil from the cylinder wall. The expander ring has two series of lugs arranged alternately on each side, which support the rails and two series of dimples arranged alternately on each side which space the rails from the expander ring. The expander ring has notches in its outer and inner circumference and is bent into a circular form. Its free ends form a butt joint.

9 Claims, 2 Drawing Sheets

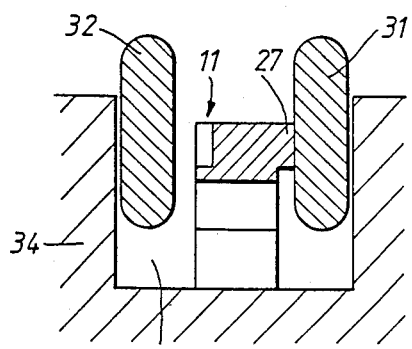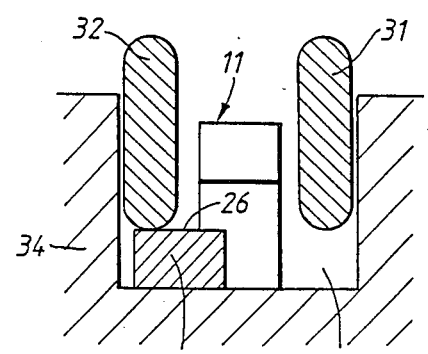
FIG. 3.   FIG. 4.
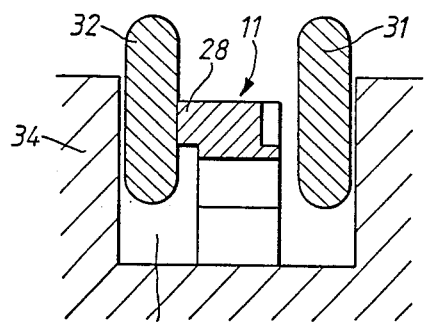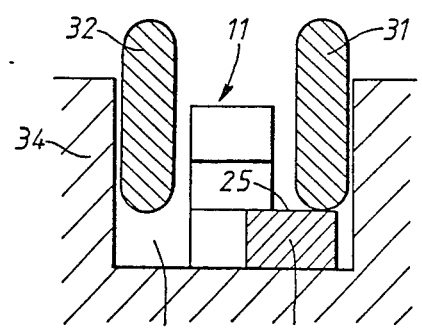
FIG. 5.   FIG. 6.
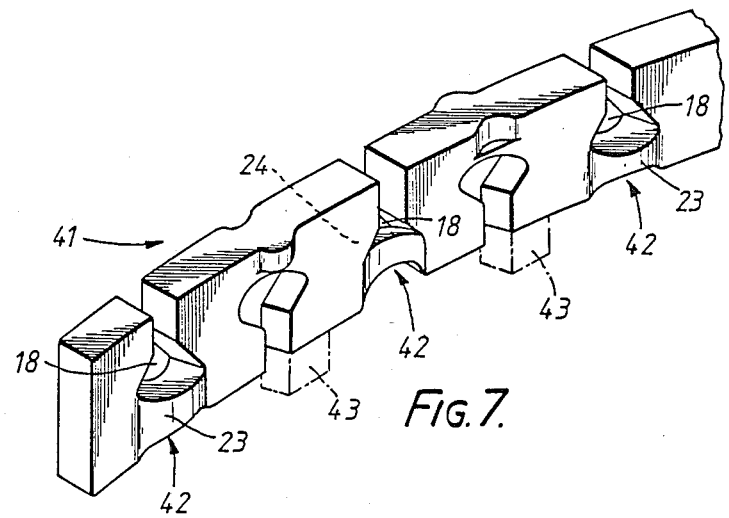
FIG. 7.

MULTIPLE PART OIL-CONTROL RING FOR PISTON

BACKGROUND OF THE INVENTION

The present invention relates to a multiple-part oil control ring for a piston e.g. in an internal combustion engine, or a compressor.

A known construction of a ring of this type comprises an expander or spring ring and one or more lamellar rings or rails supported by the expander.

The composite ring is located in a groove in the piston and the expander is arranged to urge the rails both radially outwards against the cylinder wall and axially against the walls of the groove.

The expander may take many forms though one form frequently encountered comprises a ring formed by folding a flat strip with a series of alternate cut-outs along each edge to form a U-shaped channel section and subsequently bending the channel section into a generally U-sectioned ring.

In the motor industry, engine designers wish to reduce engine dimensions to improve car body profiles and to reduce engine weight. One way of achieving this is to reduce the engine block dimension in the direction of the engine cylinders, however, it is generally preferable to do so without affecting the cylinder capacity and compression parameters. This can be done by reducing the height of the piston, and indeed this is frequently an objective sought by piston designers.

One of the drawbacks of the folded-strip form of expander described above resides in the fact that its minimum axial thickness, in practice, tends to be quite large if it is to perform its spring/support function effectively.

SUMMMARY OF THE INVENTION

It is therefore an object of the present invention to provide an oil control ring having a comparatively small dimension in the axial direction of the piston, in order to reduce the piston height.

According to the invention, there is provided a multiple-part oil-control ring for a piston which comprises an expander ring and at least one lamellar rail supported by the expander, the expander being formed from a flat strip of spring material having a first series of notches along one edge and a second series of notches alternating with the first series along the other edge, the material between the notches of the first series and the other edge of the strip being deformed to provide lugs standing proud of the surface of the strip, the strip being bent to form the expander ring with the one edge at the outer circumference of the ring and the other edge at the inner circumference of the ring, whereby the lugs provide a series of supports for the lamellar rail.

The fact that the expander ring is not folded in the axial sense means that its axial thickness may be less than that of a comparable expander of the known type described above.

Preferably, the control ring includes two rails, one on either side of the expander ring, in which case the lugs should protrude on both sides of the expander ring to support the two rails. Preferably, the lugs are punched from the strip material to protrude alternately from each surface of the expander ring.

Preferably, there are protrusions from the surface of the expander ring between the notches of the second series and the outer circumference, which act to space an annular rail from the expander ring surface. These protrusions preferably extend from both surfaces of the expander ring to space one annular rail from each surface of the expander ring and may be punched from the strip material to protrude alternately from each surface of the expander ring, to space an annular rail from each surface of the expander ring.

These protrusions, in spacing the rails from the expander ring, improve drainage from between the rails to the piston groove, which might otherwise be reliant upon the second series of notches.

Alternatively, there may be only one rail associated with the expander ring, this rail preferably being on the top or piston crown side of the expander ring. In such a construction, the lugs and protrusions on the expander ring preferably extend on one side only of the expander ring.

In a preferred embodiment the notches may be shaped to have neck widening to an opening extending towards the opposite edge of the strip. In the case of the second series of notches, these may be curved towards the outer circumference which helps to achieve a more equal spring resistance around the notch periphery and also assists in allowing a sufficient amount of material to be deformed in forming the lugs. The free ends of the expander ring 11 preferably form a butt joint.

There may be extensions on the inner circumference of the expander ring, particularly if the piston groove is comparatively deep, in order to help ensure that the composite ring is correctly located, and in order to help prevent "popping out" of the composite ring as the piston is positioned in the cylinder. The extensions may be formed integrally at the inner circumference of the expander ring, or may be separately attached. They may be present at spaced intervals between the notches of the second series, or may be present between each and every notch in which case each extension should take up a part only of the space between the notches.

In order to adjust or regulate the resilience of the expander ring, cut-away portions may be provided at the inner circumference of the expander ring at positions corresponding to positions of the notches of the first series.

The expander ring may be of stainless steel preferably with a hardness in the range HV300-350 or may be of a suitably tempered carbon steel to give the required spring properties. It will be appreciated that the strip from which the expander ring is formed may be stamped out and subsequently deformed by bend punching to form the lugs and protrusions.

It has been found that a strip thickness of 0.020 inches (0.51 mm) is preferable though this may be as low as 0.015 inches (0.38 mm) or as high as 0.025 inches (0.64 mm). The rails used may be 0.018 (0.46 mm) or 0.020 inches (0.51 mm) in thickness though they may have thicknesses in the range 0.015 inches (0.38 mm) to 0.025 inches (0.15 mm). The lugs may protrude from the surface of the expander ring by from 0.012 inches (0.30 mm) to 0.020 inches (0.51 mm). The protrusions may protrude from the surface of the expander ring by from 0.006 inches (0.15 mm) to 0.010 inches (0.25 mm). In a preferred embodiment, the strip thickness is 0.020 inches (0.51 mm), the rails are 0.018 inches (0.46 mm) in thickness, the lugs protrude by 0.015 inches (0.38 mm) and the protrusions by 0.008 inches (0.046 mm); this gives an overall composite ring thickness of 0.072 inches (1.82 mm).

The invention may be carried into practice in various ways and some embodiments will now be described by way of example with reference to the accompanying drawings.

BREIF DESCRIPTION OF THE DRAWINGS

FIGS. 3 to 6 are sections on the successive radial planes III—III, IV—IV, V—V and VI—VI shown in FIG. 2; and FIG. 7 is a view similar to FIG. 1 showing an alternative embodiment.

DETAILED DESCRIPTION OF THE PREFERRED EMBODIMENTS

Figure 1:
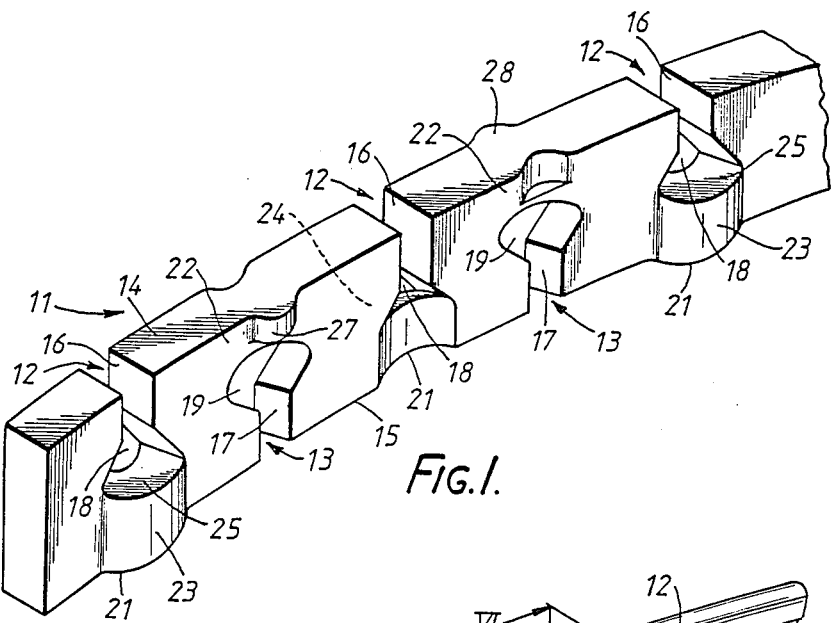
FIG. 1 is an isometric sketch of a portion of an expander ring in accordance with the present invention.

FIG. 1 shows a portion of an expander ring 11, which is formed from a flat strip of spring steel, having two series of notches 12,13 extending into the strip alternately from its outer circumference 14 and its inner circumference 15 respectively. The notches 12,13 have narrow necks 16,17 which widen into larger apertures 18,19 respectively. This arrangement leaves lands 21 of material between the apertures 18 and the inner circumference 15 and lands 22 of material between the apertures 19 (which are somewhat curved), and the outer circumference 14.

The lands 21 are bend punched axially in alternate opposite directions to form a series of lugs 23 protruding from one surface of the ring 11 and an alternating series of lugs 24 protruding from the other surface. These lugs 23,24 provide ledges 25,26. The lands 22 have dimples 27,28 punched axially in alternate opposite directions.

Figure 2:
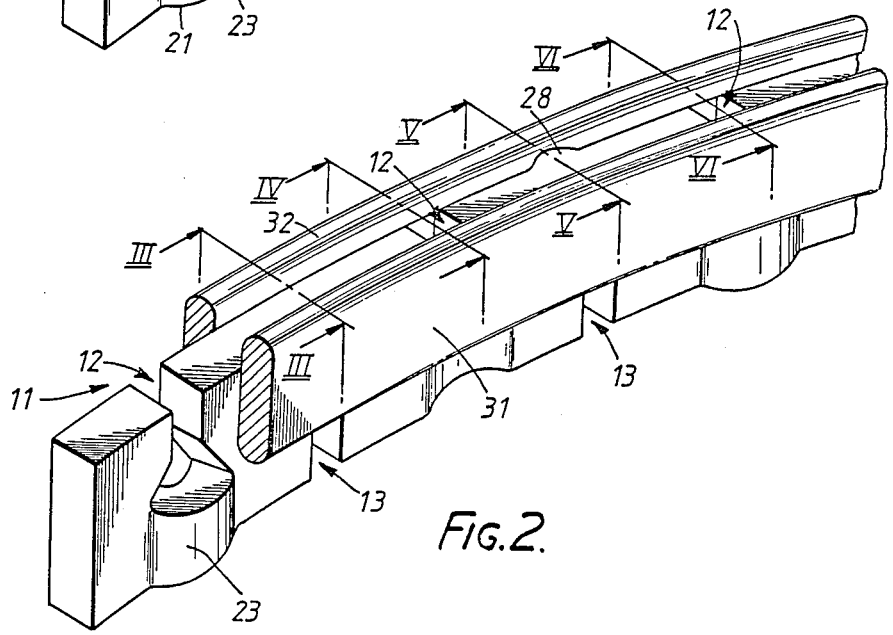
FIG. 2 is a view similar to FIG. 1 but with two rails in position, forming a composite ring.

FIG. 2 shows an assembled composite ring comprising the expander ring 11 of FIG. 1 together with a pair of lamellar rails 31,32. The rail 31 is supported on the ledges 25 and is spaced from the expander ring surface by the dimples 27. Similarly, the rail 32 is supported on the ledges 26 and is spaced from the expander ring surface by the dimples 28. This is illustrated in FIGS. 3 to 6 which show the composite ring in a groove 33 of a piston 34.

At the position shown in FIG. 3, the rail 31 is spaced by dimple 27. At the position shown in FIG. 4, the rail 32 is supported on the ledge 26 of the lug 24. At the position shown in FIG. 5, the rail 32 is spaced by the dimple 28. At the position shown in FIG. 6, the rail 31 is supported on the ledge 25 of the lug 23.

The ledges 25,26 actually provide an arcuate support which, in conjunction with the internal diameter of the rails, has the effect of causing a small axial force on the rails 31,32 at their inner peripheries. This provides side sealing so that angling of the flat base is not necessary although an angle of 2° to 10° may be provided by some pressing means, should this be required to provide additional side sealing force.

The outward load on the rails 31,32 which enables them to remove oil from the cylinder wall is obtained by compressing the expander ring 11 when the composite ring, mounted in the piston groove 33 is forced into the cylinder bore. Drainage for oil scraped from the cylinder wall between the rails 31,32 is provided by the notches 12 which communicate with drainage passages in the groove 33 and also via the spaces between the rails 31,32 and the ring surfaces, these spaces being maintained by the dimples 27,28.

FIG. 7 shows an expander ring 41 having two alternative features.

The first of these is the provision of cut-away portions 42 in the lugs 23,24 beneath the apertures 18. This may be helpful in tailoring the resilience of the expander ring as a whole and also, more particulary, to make the local resilience more nearly equal to that of the remainder of the expander ring.

The second alternative feature is the provision of extensions 43 on the inner circumference of the expander ring. These may be formed integrally when the original strip is pressed or punched out or may be attached at a later stage. They may even be of a hard wax-like material which will disappear in use since one of the main purposes is to prevent "popping out" during assembly by spacing the composite ring correctly relative to the piston groove.

Obviously, numerous modifications and variations of the present invention are possible on the light of the above teachings. It is therefore to be understood that within the scope of the appended claims, the invention may be practiced otherwise than as specifically described herein.

I claim:

1. A multiple-part oil-control ring for a piston which comprises an expander ring (11) and at least one lamellar rail (31) supported by the expander (11), characterized in that the expander (11) is formed from a flat strip of spring material having a first series of notches (12) along one edge (14) and a second series of notches (13) alternating with the first series (12) along the other edge (15), the material between the notches (12) of the first series and the other edge (15) of the strip being deformed to provide lugs (23) standing proud of the surface of the strip, said notches having a neck (16, 17) widening to an opening (18, 19) extending toward the opposite edge of the strip, the strip being bent to form the expander ring with the one edge (14) at the outer circumference of the ring and the other edge (15) at the inner circumference of the ring, whereby the lugs (23) provide a series of supports for the lamellar rail (31).

2. A control ring as claimed in claim 1 characterized in that the lugs (23, 24) are formed from the strip material to protrude alternately from each surface of the expander ring (11) as a generally U-shaped loop.

3. A control ring as claimed in claim 1 characterized by rounded protrusions (27) extending axially from the surface of the expander ring (11) between the notches of the second series and the outer circumference, which act to space an annular rail (31) from the expander ring surface.

4. A control ring according to claim 1 further including protrusions protruding extending from both of said surfaces of said expander ring to space one annular rail from each of said surfaces of said expander ring.

5. A control ring according to claim 3 wherein said protrusions are punched from the material of said strip to protrude alternately from each surface of said expander ring, thereby to space an annular rail from each said surface of said expander ring.

6. A control ring as claimed in claim 1 characterized by extensions (43) on the inner circumference of the expander ring (11).

7. A control ring as claimed in claim 1 characterized by cut-away portions (42) at the inner circumference of the expander ring (11) at position corresponding to positions of the notches (12) of the first series.

8. A multiple-part oil-control ring for a piston which comprises an expander ring (11) and at least one lamellar rail (31) supported by the expander (11), characterized in that the expander (11) is formed from a flat strip of spring material having a first series of notches (12) along one edge (14) and a second series of notches (13) alternating with the first series (12) along the other edge (15), the material between the notches (12) of the first series and the other edge (15) of the strip being deformed to provide lugs (23) standing proud of the surface of the strip, the strip being bent to form the expander ring with the one edge (14) at the outer circumference of the ring and the other edge (15) at the inner circumference of the ring, whereby the lugs (23) provide a series of supports for the lamellar rail (31), radially extending extensions (43) on the inner circumference of the expander ring (11).

9. A multiple-part oil-control ring for a piston which comprises an expander ring (11) and at least one lamellar rail (31) supported by the expander (11), characterized in that the expander (11) is formed from a flat strip of spring material having a first series of notches (12) along one edge (14) and a second series of notches (13) alternating with the first series (12) along the other edge (15), the material between the notches (12) of the first series and the other edge (15) of the strip being deformed to provide lugs (23) standing proud of the surface of the strip, the strip being bent to form the expander ring with the one edge (14) at the outer circumference of the ring and the other edge (15) at the inner circumference of the ring, whereby the lugs (23) provide a series of supports for the lamellar rail (31), the inner circumference of the ring at position corresponding to the positions of the notches (12) of the first series having cut-away portions (42).

* * * * *